F. H. WILSON.
PAN LIFTER.
APPLICATION FILED MAY 25, 1917.
1,288,346.
Patented Dec. 17, 1918.
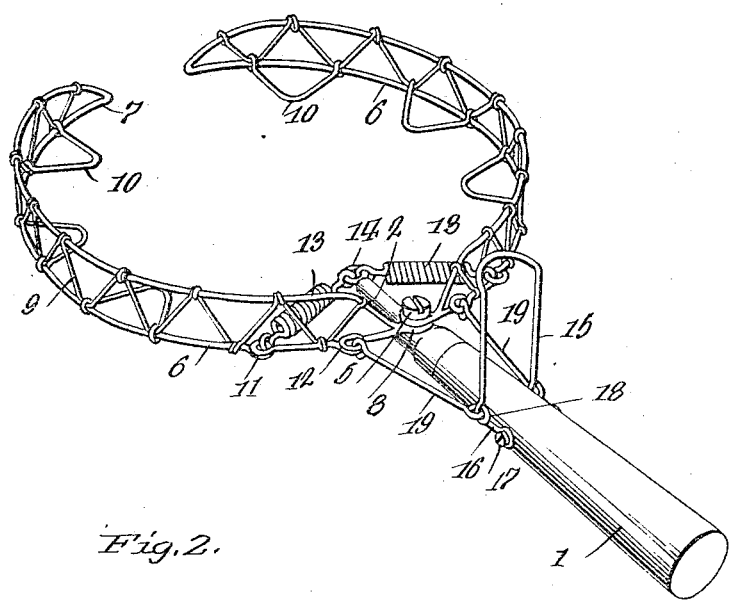
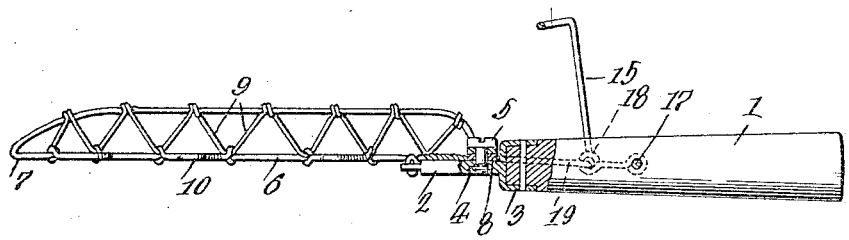
WITNESSES
INVENTOR
Frank H. Wilson,
BY
ATTORNEY

UNITED STATES PATENT OFFICE.

FRANK H. WILSON, OF HARTSTOWN, PENNSYLVANIA.

PAN-LIFTER.

1,288,346.   Specification of Letters Patent.   Patented Dec. 17, 1918.

Application filed May 25, 1917. Serial No. 170,980.

*To all whom it may concern:*

Be it known that I, FRANK H. WILSON, a citizen of the United States, residing at Hartstown, in the county of Crawford and State of Pennsylvania, have invented certain new and useful Improvements in Pan-Lifters, of which the following is a specification.

This invention relates to new and useful improvements in kitchen utensils and the principal object of the invention is to provide a device of this character for handling of plates, pie and bread pans and the like.

Another object of the invention is to provide a device of this nature with holding jaws normally held closed by spring pressure and means on the handle to be moved by the fingers for opening said jaws.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings, wherein like characters denote like or corresponding parts throughout the several views, and in which:

Figure 1 is a perspective view of the invention with the jaws in closed position.

Fig. 2 is a side view, with parts in section.

In these drawings, 1 indicates the handle and 2 indicates a stem projecting from the end of the handle and secured thereto by the ferrule 3. The stem is provided with a screw threaded socket 4 to receive a screw 5 forming a pivot for the jaws 6. As shown, each of these jaws is composed of wire bent on itself into stretches diverging from the point 7 and then the two stretches of the wire are carried parallel to each other and curved until they are brought together and bent to form the eyes 8 which are pivoted on the screw 5. The parallel stretches of the wire are connected by the reinforcing wires 9 and the bottom stretch carries V-shaped members 10 formed of wire and extending inwardly from the jaws for underlying and supporting the plates or pans. As shown, these members have their ends formed into eyes curved around the lower stretch of the wire forming the jaws and they embrace the reinforcing wires and hold the same to said stretch. The latter near its pivotal point is looped to form two eyelets 11 and 12. The eyelet 11 receives one end of a coil spring 13, the other end thereof being secured to an eyelet 14 carried by the stem 2. 15 represents a crank formed by one piece of wire bent in the shape of a U and having its ends bent at right angles, as at 16, and pivoted astride the handle 1 by means of the screws 17. Eyelets 18 are formed at the points where the wire is bent, and link rods 19 extend from the eyelets 12 to these eyelets 18 for connecting the crank with the jaws.

When it is desired to pick up a hot plate or the like, the crank is pulled over onto the handle so as to open the jaws against the pressure of the springs 13 by means of the links 19 secured to the crank. The jaws are then placed along the edge of the plate and the crank raised to close the jaws. Thus, the members 10 will come under the edge of the plate and the jaws themselves will grip the plate, and the same can be transported without having to touch the same with the fingers. As the plate is set down the crank is swung down so as to open the jaws, thus freeing the plate and permitting the removal of the device therefrom.

While I have shown the device made of wire, I do not wish to be limited in this respect, as it may be made of other material, for instance the jaws may be made by stamping them out of sheet metal.

It is thought from the foregoing that the advantages and novel features of my invention will be readily apparent.

I desire it to be understood that I may make slight changes in the construction and in the combination and arrangement of the several parts, provided that such changes fall within the scope of the appended claim.

I claim as my invention:

In a lifter for pans and the like, the combination with a handle, and manipulating mechanism thereon; of a pair of jaws pivoted at their inner ends upon said handle and respectively connected with said mechanism, each jaw being formed of a piece of wire bent upon itself into two parallel stretches overlying and spaced from each other, a zig-zag wire between and reinforcing said stretches and secured to the uppermost, and a series of V-shaped members projecting horizontally from the lower stretch and having their ends formed into eyes which embrace said lower stretch and the lower angles of the reinforcing wire.

In testimony whereof I affix my signature in presence of two witnesses.

FRANK H. WILSON.

Witnesses:
C. C. BLAIR,
L. O. McLANE.

Copies of this patent may be obtained for five cents each, by addressing the "Commissioner of Patents, Washington, D. C."